Patented Dec. 28, 1948

2,457,392

UNITED STATES PATENT OFFICE 2,457,392

HYDROGENOLYSIS OF THIOL ESTERS

Ralph Mozingo, Elizabeth, N. J., assignor to Merck & Co., Inc., Rahway, N. J., a corporation of New Jersey No Drawing. Application March 17, 1945, Serial No. 583,387

6 Claims. (Cl. 260—618)

This invention relates in a general sense to processes for the synthesis of organic compounds, and more particularly with a method for removing sulfur from organic compounds containing a thiol ester group and simultaneously hydrogenating severed components of said compounds.

In accordance with the present invention aromatic and aliphatic thiol esters are treated with a pyrophoric nickel catalyst such as Raney nickel whereby the compounds are molecularly cleaved, the sulfur in the thiol ester group is removed from the residue of the molecule, and the corresponding hydrogenated compounds are produced. This hydrogenolysis process is applicable to aliphatic and aromatic thiol esters generally, including polythiol esters of polybasic acids, and is graphically illustrated by the following reaction, wherein R and R' are aliphatic or aromatic groups:

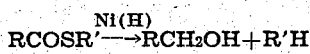

$$RCOSR' \xrightarrow{Ni(H)} RCH_2OH + R'H$$

This reaction proceeds favorably when conducted at about room temperature in the presence of a solvent, and the alcohol is recovered in high yield. In the case of aromatic thiol esters the alcohols thus formed are responsive to further hydrogenation which converts the —CH₂OH group to a —CH₃ group; and when the hydrogenolysis of an aromatic thiol ester with Raney nickel is conducted at elevated temperature, for example, at about 75–80° C., further hydrogenation takes place as the alcohol is formed, and the corresponding hydrocarbon, rather than the alcohol, is recovered.

When compounds containing both thiol ester and oxygen ester groups are subjected to hydrogenolysis according to the process of the present invention reaction takes place only with the thiol ester group and the oxygen ester group remains unchanged.

The pyrophoric nickel catalyst used in practicing the process according to the present invention can be prepared as described in U. S. Patents 1,563,587 of December 1, 1925; 1,628,190 of May 10, 1927, or 1,915,473 of June 27, 1933, or by any other similar procedure capable of yielding a body consisting predominantly of finely divided nickel with hydrogen, the latter being present as a metallic hydride, or merely adsorbed on the surface of the mass. When the catalyst is prepared as described in the above-mentioned patents, it is preferred to modify the procedure there described carrying out the final heating of the intermediate nickel-aluminum alloy in an alkaline solution at a temperature of 50–80° C. for one hour instead of at the somewhat higher temperatures specified in the patents.

The following examples illustrate methods of carrying out the present invention but it is to be understood that these examples are given by way of illustration and not of limitation.

Example I

About 7 g. of benzyl thioheptoate is added to a suspension of about 40 g. of Raney nickel catalyst in 125 cc. of ethyl alcohol. The mixture is shaken for about five minutes and allowed to stand for about twenty minutes. The catalyst is then filtered off and washed with about 125 cc. of ethyl alcohol. The combined solutions are subjected to fractional distillation and about 2.9 g. of heptyl alcohol, B. P. 176–178° C., is recovered.

Example II

About 6 g. of benzyl thioadipate in 125 cc. of methyl alcohol is shaken for about five minutes with about 40 g. of Raney nickel catalyst. The mixture is then allowed to stand for about twenty minutes, and the catalyst is filtered off and washed with about 125 cc. of methyl alcohol. The combined solutions are subjected to distillation to remove the solvent and the residue is then dried by evaporation at reduced pressure and at a temperature of 60–80° C. Upon cooling crystals of hexamethylene glycol form which, after recrystallization, melt at 41–42° C.

Example III

A mixture of about 8.4 g. of benzyl ε-carbethoxy-thiovalerate, about 40 g. of Raney nickel catalyst, and 125 cc. of ethyl alcohol is shaken for about five minutes. While shaking, the temperature of the reaction mixture rises to about 38° C. The mixture is then allowed to stand for about twenty minutes and the catalyst is filtered off and washed with about 125 cc. of ethyl alcohol. The solvent is removed by distillation leaving in the residue ε-carbethoxy-l-pentalon (or ethyl ε-hydroxy caproate). For identification of this product about 5 g. of hydrazine hydrate in about 10 cc. of ethyl alcohol is added to the residue and the solution is heated to reflux for 10–12 hours. Upon cooling the solution ε-hydroxy-caprohydrazide crystals form which, after recrystallization from ethyl alcohol, melt at 116–117° C. (the melting point reported for this compound by van Notta, Hill, and Carothers in J. A. C. S. 56, 455 (1934)).

Example IV

About 6.8 g. of benzyl thiobenzoate is added to about 40 g. of Raney nickel catalyst in 125 cc. of ethyl alcohol. The mixture is shaken for about five minutes and allowed to stand for about 30 minutes. The catalyst is then filtered off and washed with about 125 cc. of ethyl alcohol. Fractionation of the combined solutions yields about 2.4 g. of benzyl alcohol, B. P. 200–203°.

Example V

The process of Example IV is repeated through the shaking of the reaction mixture and allowing it to stand. Then without removing the catalyst from the mixture the solvent is distilled off over a period of about two hours. During this distillation benzyl alcohol present in the reaction mixture is hydrogenated by the catalyst to toluene. Thus from each molecule of benzyl thiobenzoate two molecules of toluene are formed. When the solvent is all distilled off the temperature is raised and water and toluene are distilled from the mixture. After redistillation about 4.7 g. of toluene is recovered boiling at 105–110° C.

Modifications may be made in carrying out the present invention without departing from the spirit and scope thereof, and the invention is to be limited only by the appended claims.

What is claimed is:

1. The process that comprises reacting in the presence of a solvent a pyrophoric nickel catalyst and a compound of the formula RCOSR′ where R and R′ are each selected from the class consisting of aliphatic groups and aromatic groups, at a temperature not exceeding about 80° C.

2. The process that comprises reacting in the presence of a solvent a pyrophoric nickel catalyst and a compound of the formula RCOSR′, where R and R′ are each selected from the class consisting of aliphatic groups and aromatic groups, at about room temperature and recovering an alcohol of formula $RCH_2OH$.

3. The process that comprises reacting in the presence of a solvent a pyrophoric nickel catalyst and a compound of the formula RCOSR′, where R is an aromatic group, R′ is of the class consisting of aliphatic groups and aromatic groups, at a temperature of about 75–80° C. and recovering a compound of the formula $RCH_3$.

4. The process that comprises reacting in the presence of a solvent Raney nickel and a compound of the formula RCOSR′, where R and R′ are each selected from the class consisting of aliphatic groups and aromatic groups, at a temperature not exceeding about 80° C.

5. The process that comprises reacting in the presence of a solvent Raney nickel and a compound of the formula RCOSR′, where R and R′ are each selected from the class consisting of aliphatic groups and aromatic groups, at about room temperature and recovering an alcohol of formula $RCH_2OH$.

6. The process that comprises reacting in the presence of a solvent Raney nickel and a compound of the formula RCOSR′, where R is an aromatic group, R′ is of the class consisting of aliphatic groups and aromatic groups, at a temperature of about 75–80° C. and recovering a compound of the formula $RCH_3$.

RALPH MOZINGO.

REFERENCES CITED

The following references are of record in the file of this patent:

UNITED STATES PATENTS

| Number | Name | Date |
|---|---|---|
| 2,079,414 | Lazier | May 4, 1937 |

FOREIGN PATENTS

| Number | Country | Date |
|---|---|---|
| 356,731 | Great Britain | Sept. 1, 1931 |

OTHER REFERENCES

Folkers, "Journal of the American Chemical Society," vol. 54, pages 1145–54 (1932).

Waterman, "Receuil des travaux chimiques des Pays-Bas," vol. 55, pages 854–8 (1936).

Mitsui, "Chemical Abstracts," vol. 30, 2930 (1936).

Palfray, "Bulletin de la Societe chimique de France," vol. 5, 3, 682–7 (1936).